Aug. 6, 1935.  K. SCHLAGENHAUFF  2,010,416
WATER SLUICE VALVE FOR PIPINGS
Filed Feb. 10, 1933   2 Sheets-Sheet 1

Inventor:
K. Schlagenhauff
By: Marks & Clerk
Attys.

Aug. 6, 1935. K. SCHLAGENHAUFF 2,010,416
WATER SLUICE VALVE FOR PIPINGS
Filed Feb. 10, 1933 2 Sheets-Sheet 2

Inventor:
K. Schlagenhauff
By: Marks & Clark
Attys.

Patented Aug. 6, 1935

2,010,416

UNITED STATES PATENT OFFICE 2,010,416

WATER SLUICE VALVE FOR PIPINGS

Karl Schlagenhauff, Dortmund, Germany, assignor to firm Vereinigte Stahlwerke Aktiengesellschaft, Dusseldorf, Germany Application February 10, 1933, Serial No. 656,184
In Germany May 12, 1931

2 Claims. (Cl. 137—139)

This invention relates to sluice valves for pipings having a large diameter, and particularly bottom outlet pipes subjected to high pressures.

In sluice valves of this type the shut-off member is usually a piston or cylinder guided in a closed casing. So far constructions employing as shut-off member a hollow cylinder free from inner projections have become known hydraulic drive is used exclusively, and the hollow cylinder in these constructions is further known to slide on the outer wall of the valve. According to the invention, the problem of driving is solved in a purely mechanical way and in a manner which is equally favorable both from the technical and economic point of view, while further improvements refer to the cylinder guiding.

In view of the fact that, owing to its slight resistances to motion, the cylindrical slide valve is the best construction for large internal diameters but that the hydraulic drive thereof involves technical difficulties which impair economical operation the invention proposes the provision of a mechanically actuated cylindrical valve and takes into consideration that in hydraulically operated valves all sorts of installations are required to reduce vibrations, which like the driving means are chiefly arranged inside the casing and thus not readily accessible, so that valves of this type have to be taken apart to inspect their vital parts.

The invention eliminates these drawbacks and increases safety against vibrations by causing a hollow cylindrical slide free from inner projections and moving in a casing on the outer wall of the valve to be directly engaged by outwardly guided lifting rods which are actuated from without in the direction of the axis of the lifting cylinder by mechanical driving means. In connection with the self-locking mechanical drive vibrations are prevented.

Furthermore, since the drive can be placed on the head water side, the annular or hollow cylindrical sectional outlet area in bottom outlet sluice valves may be kept short for the water jet so as to insure cavitation-free issuance of the annular water jet at each position of the lifting cylinder.

Figure 1:
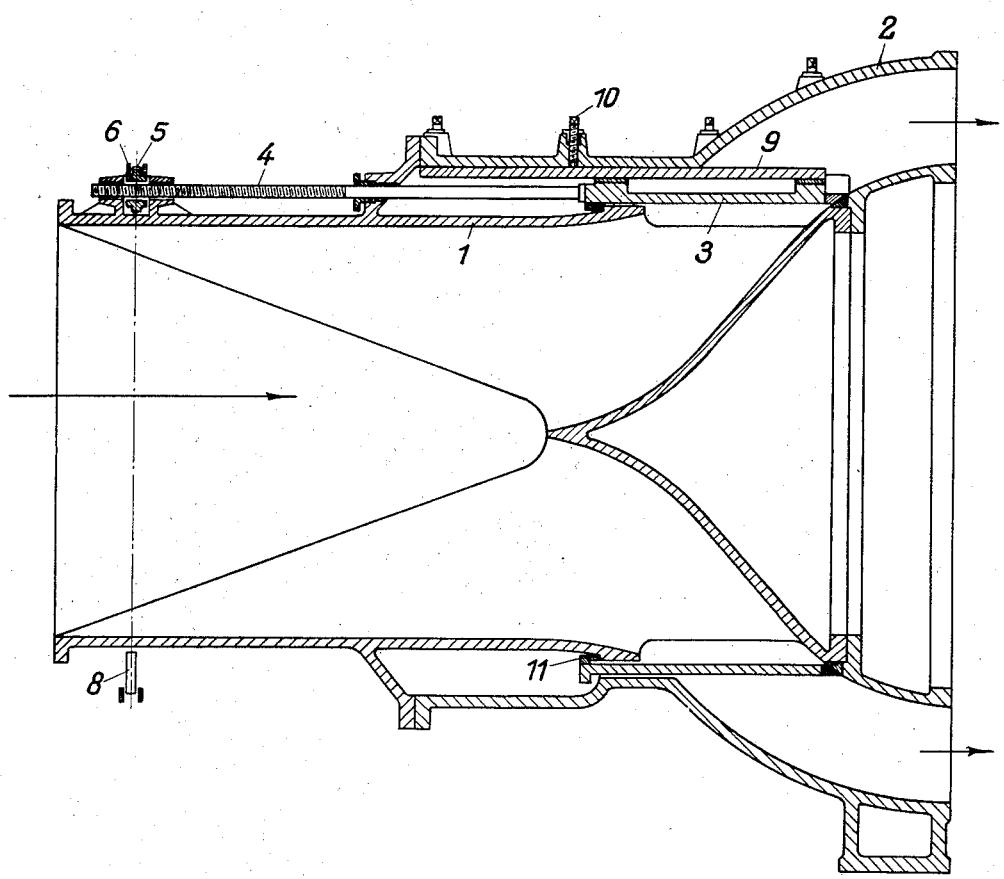
Figure 2:
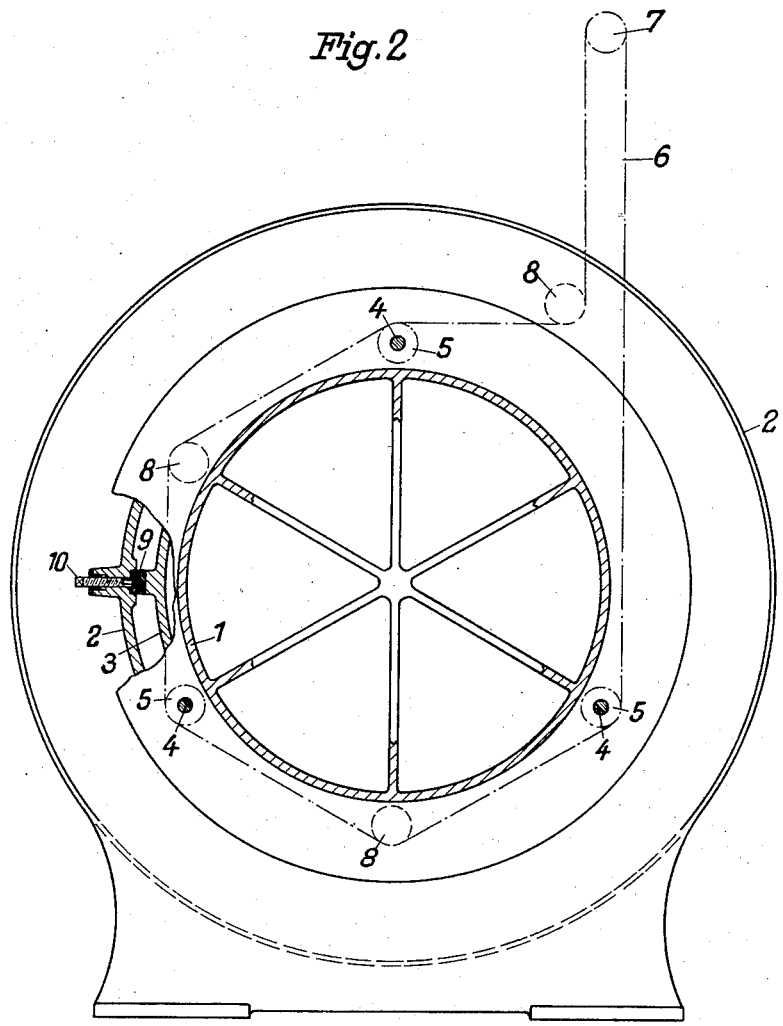

By way of example, the invention is illustrated in the accompanying drawings, in which Figure 1 is a longitudinal section of the valve according to the invention and Fig. 2, a cross section thereof.

Referring to the drawings, 1 is the body inlet pipe with the distributor hood connected by ribs, 2 the outlet member firmly connected therewith having an inner central piece as continuation of the distributor hood, 3 is the lifting cylinder movable in the direction of the valve axis and shown in locking position. 4 are the lifting rods connected with the cylinder and having threads at their outer end. 5 are the sprockets driven by the endless chain 6 and having a nut adapted for the lifting rods. 7 is the driving chain winding wheel and 8 are the loosely running chain reversing rolls.

The rods 4 of which three are shown have the same pitch of thread and the sprockets have the same number of teeth, so that the lifting cylinder is uniformly moved by all rods. The lifting cylinder is guided by the rails 9 arranged on the inside of the body and capable of being accurately adjusted from without. In large valves pressure rolls may be advantageously interposed between the rails and the cylinder which is free inside from guiding means, only the packing ring 11 being disposed on its inner wall. When open, the cylinder is pushed completely into the annular space between 1 and 2, as shown in Fig. 1, so that the lifting cylinder will move during closing in the direction of flow.

Instead of the endless chain 6 a toothed rim disposed on loose rolls may be used. The spindle nuts can be arranged on the lifting cylinder, in which case the sprockets or toothed wheels will be firmly connected with the lifting rods which thus carry out a rotary motion. The body outlet member may be provided with special ventilating devices.

As the drawings indicate, the driving means are located outside the valve body, so that they can be readily inspected during operation and removed for repairs when the cylinder is closed without interfering with damming.

The concentric position of the lifting rods, the self-locking threads thereof and the possibility afforded by the adjustable slides of guiding the cylinder without play insure cylinder motion perfectly free from vibration.

I claim:—

1. Water sluice valve for pipings having a large diameter, comprising in combination an outer tubular part provided with water outlet openings, an inner tubular part firmly connected with said outer part and forming the water inlet opening, a hollow cylinder axially movable to and fro between said outer and inner part and effecting closing and opening of the outlet, mechanical means for actuating said cylinder comprising rods connected at approximately equal distances from one another with an edge of said cylinder and extending with their free threaded end through said outer part and nuts constructed as sprockets and rotatably attached to the outer wall of said inner part, said nuts being adapted to cooperate with the threaded rod portions, an endless chain driven by a sprocket disposed outside the valve for uniformly and simultaneously actuating all sprockets and rods, and guide rails for said hollow cylinder radially adjustably arranged on the inner wall of said outer part.

2. Water sluice valve for pipings having a large diameter, comprising in combination an outer tubular part provided with water outlet openings, an inner tubular part firmly connected with said outer part and forming the water inlet opening, a hollow cylinder axially movable to and fro between said outer and inner parts and effecting closing and opening of the outlet, mechanical means for actuating said cylinder comprising rods connected at approximately equal distances from one another with an edge of said cylinder and extending with their free threaded end through said outer part and nuts rotatably disposed to the outer wall of said inner part and adapted to cooperate with said threaded rod portions, said nuts being constructed as sprockets, an endless chain driven by a sprocket disposed outside the valve for uniformly and simultaneously actuating all sprockets and rods, and guide rails for said hollow cylinder, said rails being radially adjustably arranged at the inner wall of said outer part and at approximately equal distances from one another in radial direction.

KARL SCHLAGENHAUFF.